(12) United States Patent
Yamazaki

(10) Patent No.: US 9,331,463 B2
(45) Date of Patent: May 3, 2016

(54) WIRE FIXTURE

(71) Applicant: SANYO DENKI CO., LTD., Tokyo (JP)

(72) Inventor: Tetsuya Yamazaki, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 0 days.

(21) Appl. No.: 14/721,370

(22) Filed: May 26, 2015

(65) Prior Publication Data

US 2015/0349505 A1     Dec. 3, 2015

(30) Foreign Application Priority Data

May 27, 2014   (JP) ................ 2014-109398

(51) Int. Cl.
*H02G 3/22*   (2006.01)

(52) U.S. Cl.
CPC ....................... *H02G 3/22* (2013.01)

(58) Field of Classification Search
CPC ............ H02G 3/22; H02G 3/24; H02G 3/26; H02G 3/28; H02G 3/30; H02G 3/36; H02G 15/00; H02G 15/013; H02G 15/007; H02G 15/04; F16L 5/00; F16L 37/0985; F16B 21/076
USPC ....... 174/481, 482, 650, 72 A, 152 G, 153 G, 174/152 R, 135, 91, 137, 652, 653, 654, 174/665, 664; 277/590, 602, 608, 314; 248/49, 68.1; 285/215
See application file for complete search history.

(56) References Cited

U.S. PATENT DOCUMENTS

| | | | | |
|---|---|---|---|---|
| 3,506,999 A | * | 4/1970 | Neher | F16B 21/076 174/152 G |
| 4,216,930 A | * | 8/1980 | Rossler, Jr. | F16L 5/00 174/153 G |
| 5,355,109 A | * | 10/1994 | Yamazaki | H02G 3/22 174/664 |
| 6,010,134 A | * | 1/2000 | Katoh | H02G 15/013 174/152 G |
| 7,102,080 B2 | * | 9/2006 | Nakamrura | H02G 3/088 174/153 G |
| 8,042,839 B2 | * | 10/2011 | Rammhofer | F16L 37/0985 285/215 |

FOREIGN PATENT DOCUMENTS

JP     2005-341659     12/2005

* cited by examiner

*Primary Examiner* — Angel R Estrada
(74) *Attorney, Agent, or Firm* — Rankin, Hill & Clark LLP

(57) ABSTRACT

A wire fixture for fixing an electric wire in a wire mounting hole formed in a panel includes: a fixing member to be wound and fixed around the electric wire; a first cable bushing including a first main body portion to be attached to the electric wire from one side in a radial direction; and a second cable bushing including a second main body portion to be attached to the electric wire from the other side in the radial direction. The first and second cable bushings each include a locking member that extends in one direction from each of the first and second main body portions in a longitudinal direction of the electric wire to lock the fixing member.

13 Claims, 8 Drawing Sheets

WIRE FIXTURE

CROSS-REFERENCE TO RELATED APPLICATION

This application claims priority from Japanese Patent Application No. 2014-109398 filed with the Japan Patent Office on May 27, 2014, the entire content of which is hereby incorporated by reference.

BACKGROUND

1. Technical Field

An embodiment of the present disclosure relates to a wire fixture for fixing an electric wire.

2. Description of the Related Art

In an electric apparatus having a lead wire such as a power cord, the lead wire is fixed to a wire leading portion of a casing panel so that a load is hardly applied to an electrical connection portion of the lead wire. For example, a small capacity uninterruptible power supply (UPS) uses a cable bushing for fixing a lead wire to a wire leading portion of a casing panel.

For example, an electrical junction box is disclosed as a technique related to the cable bushing (see JP-A-2005-341659). In the electrical junction box, an outer wall of the case is provided with a wire leading hole by cutting its upper end in a U shape. A wire fixing member is detachably fitted into the wire leading hole from the upper end. A locking tool is locked at a portion to be locked that is provided to the wire fixing member. The locking tool is wound around to be fixed to an electric wire drawn out from the inside of the case. Consequently, a wire lead distance from the outer wall of the case is defined.

SUMMARY

A wire fixture for fixing an electric wire in a wire mounting hole formed in a panel includes: a fixing member to be wound and fixed around the electric wire; a first cable bushing including a first main body portion to be attached to the electric wire from one side in a radial direction; and a second cable bushing including a second main body portion to be attached to the electric wire from the other side in the radial direction. The first and second cable bushings each include a locking member that extends in one direction from each of the first and second main body portions in a longitudinal direction of the electric wire to lock the fixing member.

DESCRIPTION OF THE EMBODIMENTS

Figure 1:
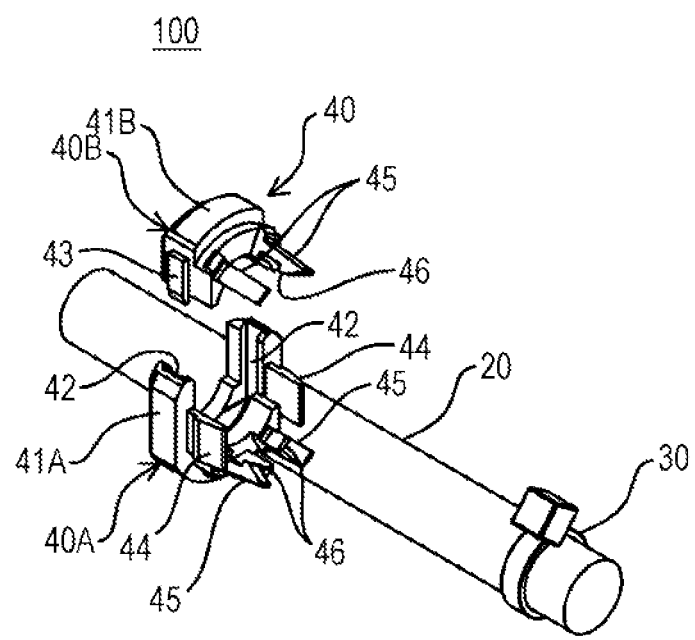
FIG. 1 is a perspective view of a wire fixture according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With a cable bushing that sandwiches and fixes a lead wire, if the stiffness of the wire is high, the work of partially bending the wire is difficult. Thus, the work efficiency in wire fixation poor.

Moreover, according to the technique of JP-A-2005-341659, the locking tool is wound around and fixed to an electric wire. The locking tool is locked at the portion to be locked of a first wire fixing member fitted into a wire leading hole, and the electric wire is heled by a second wire fixing member from above.

Accordingly, in the technique of JP-A-2005-341659, the number of parts for fixing the electric wire is large, and thus the work efficiency in wire fixation is impaired. Moreover, the panel is cut in a U shape to form the wire leading hole, and thus the design is degraded.

An object of an embodiment of the present disclosure is to provide a wire fixture that can improve work efficiency in wire fixation and has excellent appearance design.

A wire fixture according to an embodiment of the present disclosure (the present wire fixture) for fixing an electric wire in a wire mounting hole formed in a panel includes: a fixing member to be wound and fixed around the electric wire; a first cable bashing including a first main body portion to be attached to the electric wire from one side in a radial direction; and a second cable bushing including a second main body portion to be attached to the electric wire from the other side in the radial direction. The first and second cable bushings each include a locking member that extends in one direction from each of the first and second main body portions in a longitudinal direction of the electric wire to lock the fixing member.

According to the present wire fixture, the number of parts for fixing the electric wire can be reduced. Furthermore, with a simple procedure, the fixing member can be locked by the locking members extending from the first main body portion of the first cable bushing and the second main body portion of the second cable bushing. Thus, the work efficiency in wire fixation can be improved.

In the present wire fixture, the first main body portion of the first cable bushing and the second main body portion of the second cable bashing may be fixed to the wire mounting hole formed in the panel. In this case, the appearance design can be improved.

Hereinafter, wire fixtures according to first and second embodiments will be described with reference to the drawings.

In the wire fixtures according to the first and second embodiments, the number of parts for fixing an electric wire can be reduced. Furthermore, with a simple procedure, the fixing be r is locked by locking claws of the locking members extending from the first main body portion of the first cable bushing and the second main body portion of the second cable bushing. The first main body portion of the first cable bushing and the second main body portion of the second cable bushing are fixed to the wire mounting hole formed in the panel of a casing. Therefore, a wire fixture, which can improve the work efficiency in wire fixation and has excellent appearance design, can be provided according to the first and second embodiments.

First Embodiment

Configuration of Wire Fixture

Figure 2:
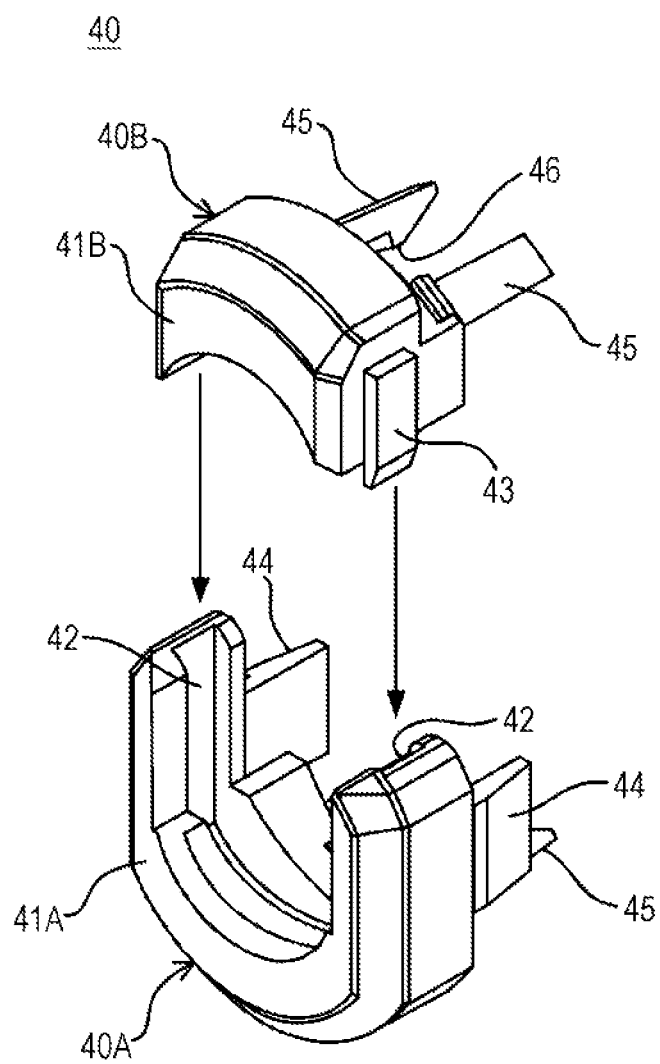
FIG. 2 is a perspective view of a cable bushing in the first embodiment as viewed from the outer side.
Figure 3:
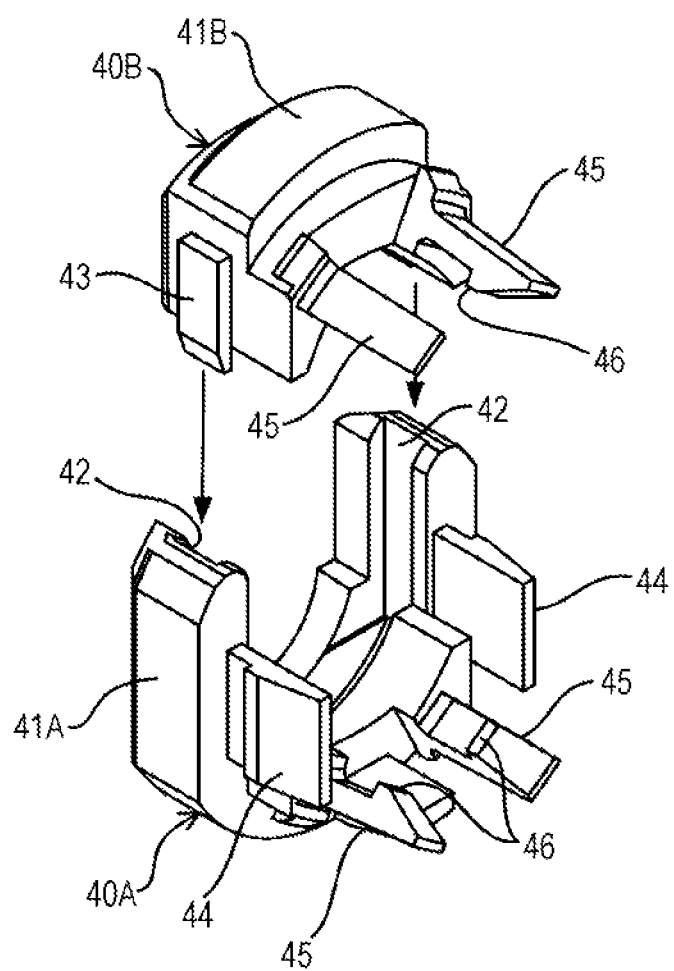
FIG. 3 is a perspective view of the cable bushing in the first embodiment as viewed from the inner side.
Figure 4:
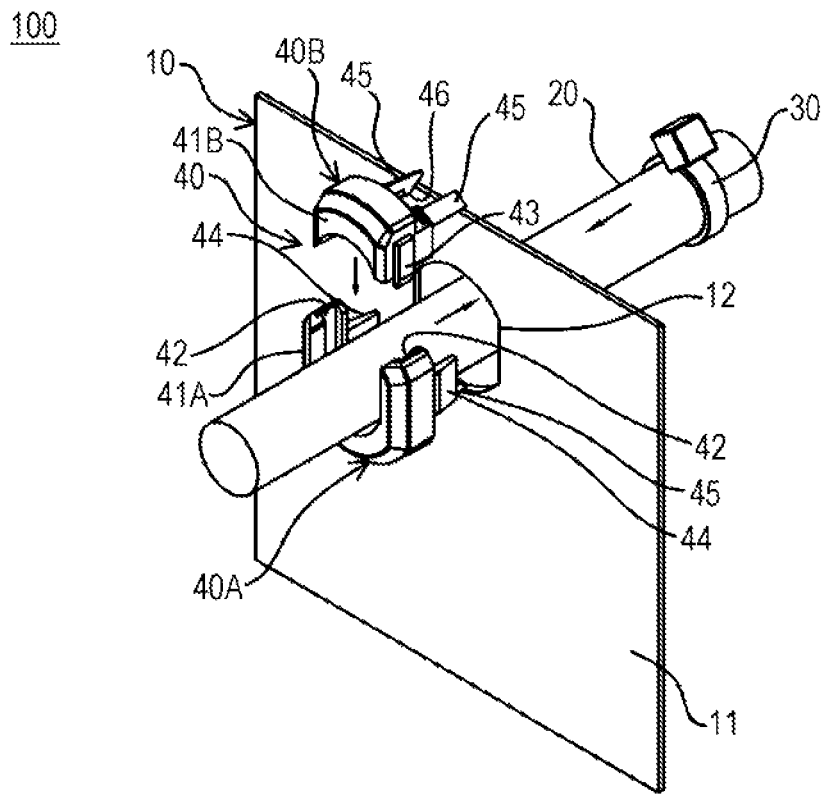
FIG. 4 is a diagram for describing a procedure for mounting the wire fixture according to the first embodiment.

Firstly, the configuration of the wire fixture according to the first embodiment will be described with reference to FIGS. 1 to 4. FIG. 1 is a perspective view of the wire fixture according to the first embodiment FIG. 2 is a perspective view of a cable bushing in the first embodiment as viewed from the outer side. FIG. 3 is a perspective view of the cable bushing in the first embodiment as viewed from the inner side. FIG. 4 is a diagram fin describing a procedure for mounting the wire fixture according to the first embodiment.

As illustrated in FIG. 1, a wire fixture 100 according to the first embodiment includes a fixing member 30, and a cable bushing 40 for locking the fixing member 30.

The fixing member 30 is wound around an electric wire 20 tube fixed to the electric wire 20. As the fixing member 30, a known synthetic resin tying band is preferably used, for example. However, the fixing member 30 is not limited to the tying band, and may be any member that is thick and can be wound around and fixed to the electric wire 20, such as a rubber band or adhesive band. The fixing member 30 has, for example, a cuboid tying portion.

An electric wire coated with synthetic resin is used as the electric wire 20. A base end portion of the electric wire 20 is electrically connected to an unillustrated electric apparatus housed in a casing 10. As illustrated in FIG. 4, the electric wire 20 is drawn out to the outside from a wire mounting hole 12 formed on a panel 11 of the casing 10. The wire mounting hole 12 of the first embodiment is provided as a long hole having straight left and right sides and arc-shaped upper and lower sides. However, the shape of the wire mounting hole 12 is not limited thereto.

As illustrated in FIGS. 1 to 3, the cable bushing 40 includes a first cable bushing 40A and a second cable bushing 40B. The first cable bushing 40A and the second cable bushing 40B are fitted to each other so as to sandwich the electric wire 20 from the outside in the radial direction.

The first cable bushing 40A is arranged on the lower side of the electric wire 20. A main body portion (first main body portion) 41A of the first cable bushing 40A has a substantially U shape. The main body portion 41A is attached to the electric wire 20 from one side in the radial direction. Straight recesses 42 are respectively formed in both the inner side surfaces of the main body portion 41A of the first cable bushing 40A.

On the other hand, the second cable bushing 40B is arranged on the upper side of the electric wire 20. A main body portion (second main body portion) 41B of the second cable bushing 40B has a substantially are shape. The main body portion 41B is attached to the electric wire 20 from the other side in the radial direction. Straight protrusions 43 are respectively formed on both the outer side surfaces of the main body portion 41B of the second cable bushing 40B. The protrusion 43 of the main body portion 41B of the second cable bushing 40B is slid into the recess 42 of the main body portion 41A of the first cable bashing 40A. In other words, the main body portions 41A and 41B are fitted to each other while sandwiching the electric wire 20.

A pair of substantially plate-shaped support members 11 is protruded from both the inner edges on a panel contact surface of the main body portion 41A of the first cable bushing 40A. Each support member 44 includes a slope portion to facilitate insertion into the wire mounting hole 12. The thickness of the slope portion is gradually increased from its tip portion to its base portion. The base portion of the slope portion is provided with a recess. The recess of each support member 44 is fitted to each side of the wire mounting hole 12 formed on the panel 11, so that the horizontal displacement of the cable bushing 40 is regulated.

In other words, the support members 44 are fitted into the wire mounting hole 12. The support members ill need to be included in at least one of the main body portion 41A of the first cable bushing 40A and the main body portion 41B of the second cable bushing 40B.

A pair of locking members 45 extends in one direction from each of the main body portion 41A of the first cable bushing 40A and the main body portion 41B of the second cable bushing 40B. In other words, four locking members 45 are provided in total at upper and lower positions to extend from the cable bushing 40 of the embodiment. In other words, the first cable bushing 40A and the second cable bushing 40B each include a plurality of the locking members 45.

Each locking member 45 extends in one direction along the surface of the electric wire 20 from the main body portion 41A of the first cable bushing 40A or the main body portion 41B of the second cable bushing 40B toward the length direction of the electric wire 20 (along the longitudinal direction). Each locking member 45 is thin and has a substantially narrow rectangular shape. The outer surface of the locking member 45 comes into contact with the upper or lower side of the wire mounting hole 12 formed on the panel 11 to regulate the vertical displacement of the cable bushing 40.

Each locking member 45 is a member for locking the fixing member 30 to the cable bushing 40. Therefore, a locking claw 46 is faulted at a tip portion on the inner surface of each locking member 45. In other words, the locking member 45 has the locking claw 46 at the tip portion on the inner surface of the locking member 45. Each locking claw 46 is formed in a half-arrowhead shape (right-angled triangle shape) along the surface of the electric wire 20. Each locking claw 46 locks the fixing member 30 wound around the electric wire 20.

Examples of the material for faulting the first cable bushing 40A and the second cable bushing 40B include synthetic resin material and hard rubber. However, the material for forming the first cable bushing 40A and the second cable bushing 40B is not limited to these materials.

Operation of Wire Fixture

Figure 5:
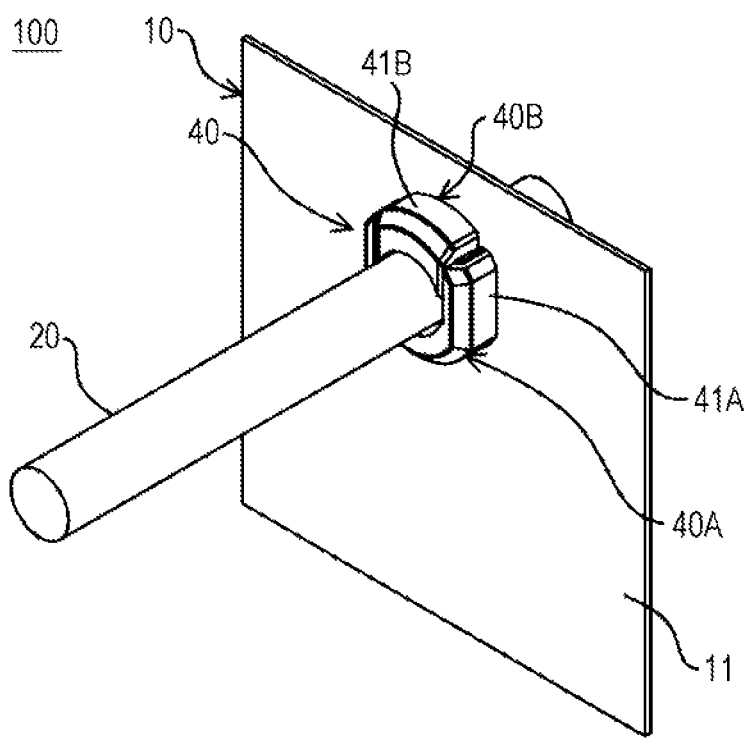
FIG. 5 is a perspective view of a mounting state of the wire fixture according to the first embodiment as viewed from the outer side.
Figure 6:
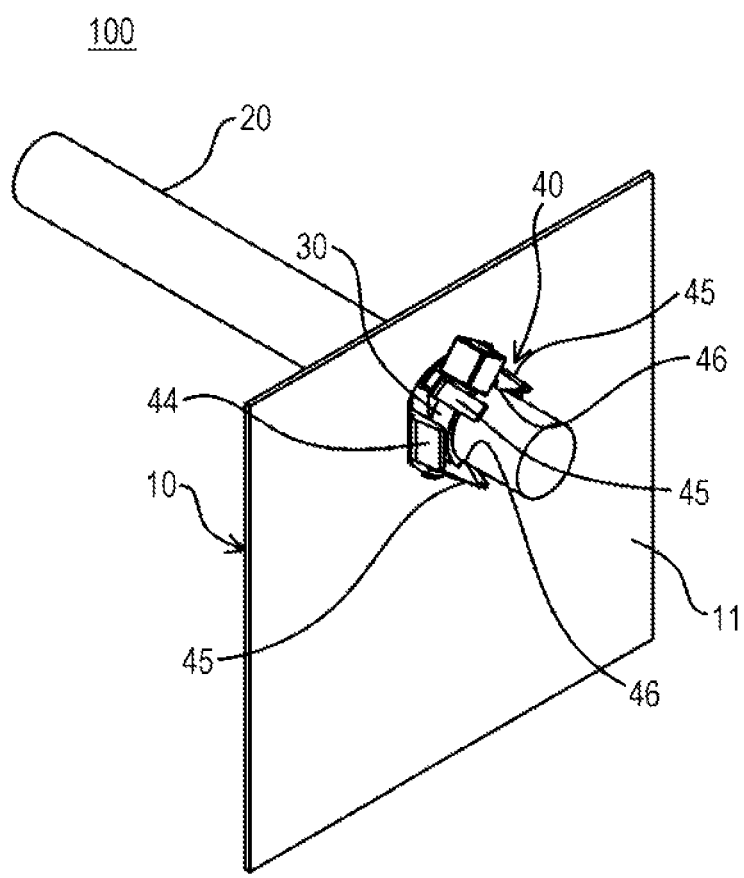
FIG. 6 is a perspective view of the mounting state of the wire fixture according to the first embodiment as viewed from the inner side.

Next, the operation of the wire fixture 100 according to the first embodiment will be described with reference to FIGS. 1 to 6. FIG. 5 is a perspective view of the mounting state of the wire fixture according to the first embodiment as viewed from the outer side. FIG. 6 is a perspective view of the mounting state of the wire fixture according to the first embodiment as viewed from the inner side.

The wire fixture 100 according to the first embodiment is a fixture for fixing the electric wire 20 in the wire mounting hole 12 formed on the panel 11 of the casing 10 so that a load is hardly applied to an electrical connection portion of the electric wire 20.

As illustrated in FIG. 4, in the procedure for mounting the wire fixture 100 according to the first embodiment, firstly, the first cable bushing 40A (the main body portion 41A) and the second cable bushing 40B (the main body portion 41B) are fitted to each other on the outer side of the panel 11 of the casing 10 in such a manner as to sandwich the electric wire 20 from the outside in the radial direction. Specifically, the protrusion 43 of the main body portion 41B of the second cable bushing 40B is slid into the recess 42 of the main body portion 41A of the first cable bushing 40A. The first cable bushing 40A and the second cable bushing 40B are integrated as a single cable bushing 40 while sandwiching the electric wire 20.

Next, the support members 44 and the locking members 45 of the cable bushing 40 are inserted into the wire mounting hole 12 of the panel 11.

Furthermore, the fixing member 30 is wound and fixed around the electric wire 20 on the inner side of the panel 11 of the casing 10. A tying band is used as the fixing member 30, so that the fixing member 30 can be wound and fixed around the electric wire 20 easily and firmly. As a result, the cost can be further reduced.

When the electric wire 20 is pulled in the drawing direction, the fixing member 30 wound and fixed around the electric wire 20 gradually comes closer to the cable bushing 40. When the fixing member 30 reaches the tip portion of each locking member 45 of the cable bathing 40, the locking member 45 bends outward along the slope of the half-arrowhead shaped locking claw 46. Consequently, as illustrated in. FIGS. 5 and 6, the locking claw 46 climbs over the fixing member 30 and locks the fixing member 30. When the locking claws 46 lock the fixing member 30, the cuboid tying portion of the fixing member 30 is fitted in any of spaces between four locking members 45 of the cable bushing 40. In other words, the fixing member 30 (tying portion) is provided to be fitted between a plurality of the locking members 45. The fixing member 30 (tying portion) may be fitted between the locking members 45 of the first cable bushing 40A or between the locking members 45 of the second cable bushing 40B.

In such a manner, the electric wire 20 is held by the cable bushing 40, the cable bushing 40 is mounted in the wire mounting hole 12 of the panel 11, and the electric wire 20 is pulled until the fixing member 30 is fixed, so that the electric wire 20 can be fixed to the casing 10.

In the wire fixture 100 according to the first embodiment, it is possible to reduce the number of parts for fixing the electric wire 20 and lock the fixing member 30 with the locking members 45 of the cable bushing 40 with a simple procedure. Thus, the work efficiency in wire fixation can be improved.

The small wire mounting hole 12 formed on the panel 11 of the casing 10. The cable bushing 40 is inserted into and fixed in the wire mounting hole 12. Thus, the wire fixture 100 has excellent appearance design.

Second Embodiment

Figure 7:
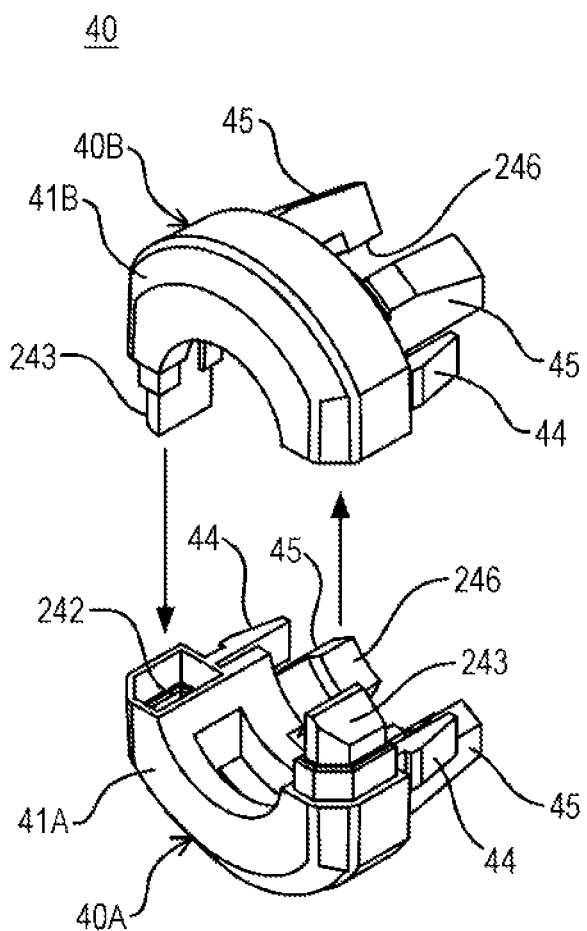
FIG. 7 is a perspective view of a cable bushing in a second embodiment as viewed from the outer side.
Figure 8:
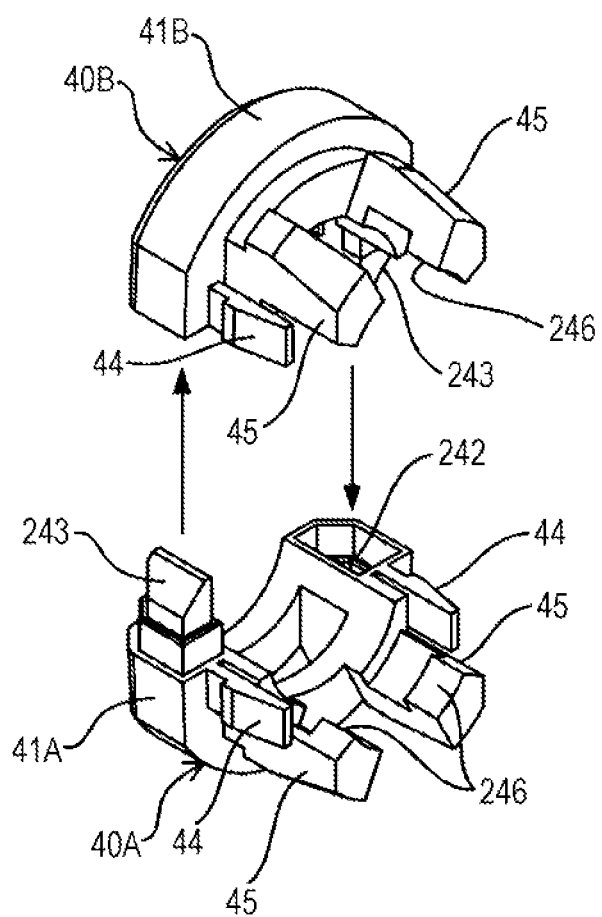
FIG. 8 is a perspective view of the cable bushing in the second embodiment as viewed from the inner side.
Figure 9:
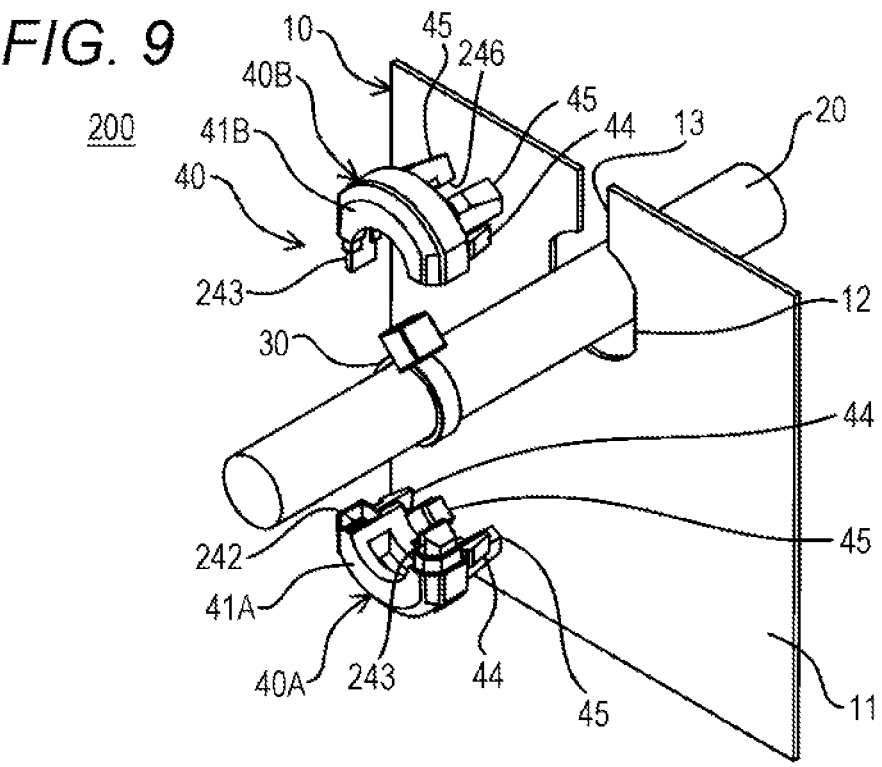
FIG. 9 is a perspective view of a wire fixture according to the second embodiment as viewed from the outer side for describing a procedure for mounting the wire fixture.
Figure 10:
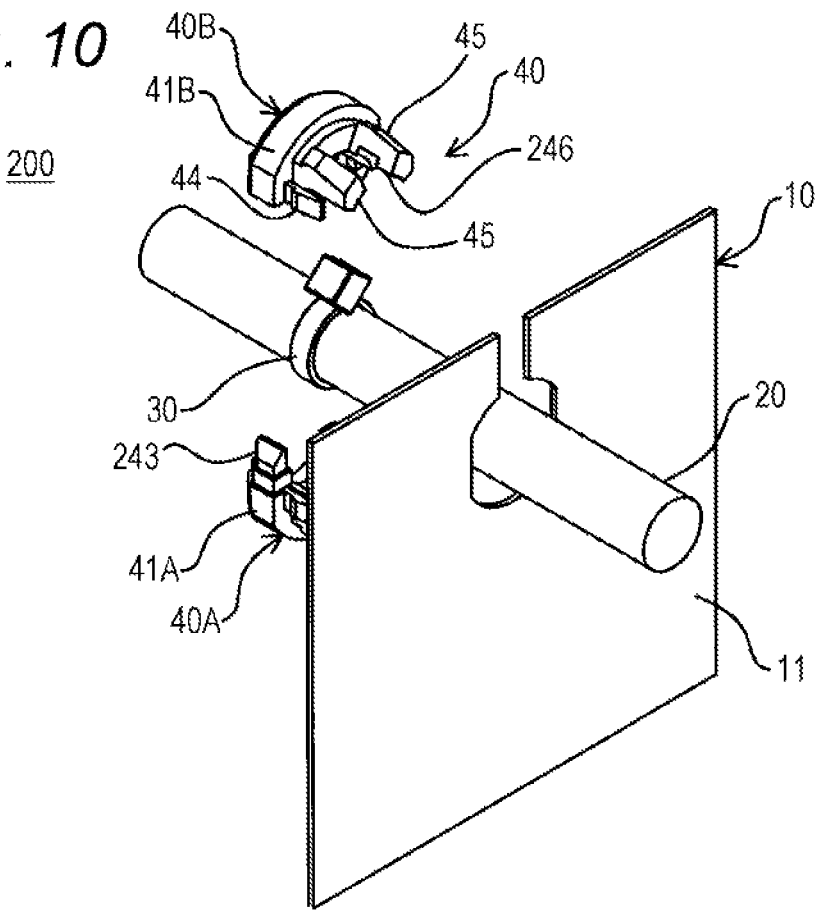
FIG. 10 is a perspective view of the wire fixture according to the second embodiment as viewed from the inner side for describing the procedure for mounting the wire fixture.

Next, a procedure for mounting the wire fixture according to the second embodiment will be described with reference to FIGS. 7 to 10. FIG. 7 is a perspective view of a cable bushing in the second embodiment as viewed from the outer side. FIG. 8 is a perspective view of the cable bushing in the second embodiment as viewed from the inner side. FIG. 9 is a perspective view of the wire fixture according to the second embodiment as viewed from the outer side for describing the procedure for mounting the wire fixture. FIG. 10 is a perspective view of the wire fixture according to the second embodiment as viewed from the inner side for describing the procedure for mounting the wire fixture. In the second embodiment, the same reference numerals are assigned to the same components as those in the first embodiment and duplicated description thereof is omitted.

As illustrated in FIGS. 7 and 8, a wire fixture 200 according to the second embodiment is different from the first embodiment in that the first cable bushing 40A and the second cable bushing 40B are formed into the same shape. Both of the main body portion 41A of the first cable bushing 40A and the main body portion 41B of the second cable bushing 40B have a substantially arc shape.

Moreover, the wire fixture 200 according to the second embodiment is different from the first embodiment in the fitting structure of the main body portion 41A of the first cable bushing 40A and the main body portion 41B of the second cable bushing 40B. Specifically, a protrusion 243 is formed on one side portion of each of the main body portion 41A of the first cable bushing 40A and the main body portion 41B of the second cable bushing 40B. On the other hand, a recess 242 is formed on the other side portion of each of the main body portions 41A and 41B. The protrusion 243 of the second cable bushing 40B is fitted and fixed in the recess 242 of the first cable bushing 40A and the protrusion 243 of the first cable bushing 40A is fitted and fixed in the recess 242 of the second cable bushing 40B, so that the first cable bushing 40A and the second cable bushing 40B are integrated.

Moreover, in the wire fixture 200, the thickness of the locking member 45 is thicker than that of the first embodiment, and accordingly, the locking member 45 hardly bends. In the wire fixture 200, a locking claw 246 at the tip portion of the locking member 45 is thicker than the locking claw 46 of the first embodiment, and is formed in a hook shape.

Furthermore, as illustrated in FIGS. 9 and 10, in the wire fixture 200, the main body portion 41A of the first cable bushing 40A and the main body portion 41B of the second cable bushing 40B are formed to have a substantially arc shape. Accordingly, the length of the long hole-shaped wire mounting hole 12 is shorter than that of the first embodiment. A substantially straight notch 13 is linked to the upper portion of the wire mounting hole 12.

The procedure for moral mg the wire fixture 200 according to the second embodiment will be described. Firstly, the fixing member 30 is wound and fixed around the electric wire 20 on the outer side of the panel 11 of the casing 10. A tying band is preferably used as the fixing member 30 as in the first embodiment.

Next, the first cable bushing 40A (the main body portion 41A) and the second cable bushing 40B (the main body portion 41B) are fitted to each other on the outer side of the panel 11 of the casing 10 so as to sandwich the electric wire 20 from the outside in the radial direction. Specifically, the protrusion 243 of the main body portion 41B of the second cable bushing 40B is slid into the recess 242 of the main body portion 41A of the first cable bushing 40A.

At this point, the first cable bushing 40A (the main body portion 41A) and the second cable bushing 40B (the main body portion 41B) are fitted to each other in such a manner that the fixing member 30 is locked by the hook-shaped locking claws 246 of the locking members 45 extending from the main body portion 41A of the first cable bushing 40A and the main body portion 41B of the second cable bushing 40B.

The first cable bushing 40A and the second cable bushing 40B are integrated as a single cable bushing 40, while the first cable bushing 40A and the second cable bushing 40B sandwich the electric wire 20 and the locking claws 246 of the locking members 45 lock the fixing member 30.

The main body portion of the cable bushing 40 is inserted and fixed in the wire mounting hole 12 formed on the panel 11 of the casing 10 from the outer side of the panel 11.

The mounting procedure as described above is adopted because the locking member 45 is formed thicker than that of the first embodiment and is formed to be hardly bended so as to prevent the cable bushing 40 from being detached from the fixing member 30.

The wire fixture 200 according to the second embodiment basically has the same advantageous effects as the wire fixture 100 according to the first embodiment. Especially, in the wire fixture 200 according to the second embodiment, the first cable bushing 40A and the second cable bushing 40B have the same shape. Thus, it is possible to obtain an advantageous effect that the cable bushings 40A and 40B can be formed with the same forming die. Moreover, in the wire fixture 200 according to the second embodiment, even if excessive force that presses the electric wire 20 into the casing 10 is applied to the electric wire 20, the locking member 45 is not easily bended compared with that of the first embodiment and accordingly the locking claw 46 of the locking member 45 is not detached from the fixing member 30.

The preferred embodiments of the present disclosure have been described above. However, the foregoing description is intended only for explanation of the present disclosure, and is not intended to limit the technical scope of the present disclosure to the foregoing embodiments. The technique of the present disclosure CAB be carried out in various modes different from the above embodiments without deviating from the gist of the present disclosure.

For example, in the embodiments, the second cable bushing 40B and the first cable bushing 40A are arranged across the electric wire 20 at the upper and lower positions. However, the arrangement is not limited thereto. The second cable bushing 40B and the first cable bushing 40A may be arranged at, for example, the left and right sides of the electric wire 20. Furthermore, in the first embodiment, the protrusion 43 of the main body portion 41B of the second cable bushing 40B is slid into the recess 42 of the main body portion 41A of the first cable bushing 40A. However, the fitting structure of the recess 42 and the protrusion 43 is not limited to the titling structure of the embodiment. In the embodiments, the first cable bushing 40A and the second cable bushing 40B each include a plurality of locking members 45. However, at least one of the first cable bushing 40A and the second cable bushing 40B may include one locking member 45.

An embodiment of the present disclosure may be a wire fixture for fixing an electric wire in a through hole of the panel. The locking claw 46 may be formed in a half-arrowhead shape (right-angled triangle shape) to face the surface of the electric wire 20. In the second embodiment, as illustrated in FIGS. 9 and 10, the main body portion 41A of the first cable bushing 40A and the main body portion 41B of the second cable bushing 40B are formed in a substantially arc shape. Accordingly, the long hole-shaped wire mounting hole 12 is shorter than that of the first embodiment.

A wire fixture according to an embodiment of the present disclosure may be any of the following first to fourth wire fixtures.

The first wire fixture is a wire fixture for inserting an electric into a wire mounting hole formed in a panel to fix the electric wire, and includes a fixing member to be wound and fixed around the electric wire, and first and second cable bushings each having a main body portion to be fitted to each other in such a manner as to sandwich the electric wire from the outer side in a radial direction, wherein the first and second cable bushings each have a locking member that extends in one direction from each main body portion in the longitudinal direction of the electric wire and the locking members lock the fixing member.

In the second wire fixture according to the first wire fixture, the locking member has a locking claw formed at a tip portion on an inner surface of the locking member to lock the fixing member.

In the third wire fixture according to the first or second wire fixture, the first and second cable bushings each have a plurality of locking members, and the fixing member is fitted between the locking members of the fast or second cable bushing.

In the fourth wire fixture according to any of the first to third wire fixtures, at least one of the main body portion of the first cable bushing and the main body portion of the second cable bushing is provided, in a protruding manner, with a support member to be fitted in the wire mounting hole.

The first to fourth wire fixtures have a small number of parts and can lock the fixing member with the locking claws of the locking members extending from the main body portions of the first and second cable bushings in a simple procedure. Accordingly, the work efficiency in wire fixation can be improved.

Moreover, the first to fourth wire fixtures fix the main body portions of the first and second cable bushings in the wire mounting hole formed in the panel. Accordingly, the excellent appearance design can be provided.

The foregoing detailed description has been presented for the purposes of illustration and description. Many modifications and variations are possible in light of the above teaching. It is not intended to be exhaustive or to limit die subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A wire fixture for fixing an electric wire in a wire mounting hole formed in a panel, the wire fixture comprising:
    a fixing member to be wound and fixed around the electric wire;
    a first cable bushing including a first main body portion to be attached to the electric wire from one side in a radial direction; and
    a second cable bushing including a second main body portion to be attached to the electric wire from the other side in the radial direction, wherein
    the first and second cable bushings each include a locking member that extends in one direction from each of the first and second main body portions in a longitudinal direction of the electric wire to lock the fixing member, and
    each of the locking members of the first and second cable bushings includes a locking claw for locking the fixing member at a tip portion of the locking member, the locking claw being formed on an inner surface of the locking member and projecting inward in the radial direction from the inner surface.

2. The wire fixture according to claim 1, wherein the first and second main body portions are fitted to each other, while sandwiching the electric wire.

3. The wire fixture according to claim 1, wherein the first and second cable bushings each include a plurality of the locking members, and the fixing member is fitted between the locking members of the first cable bushing or between the locking members of the second cable bushing.

4. The wire fixture according to claim 2, wherein
the first and second cable bushings each include a plurality of the locking members, and
the fixing member is fitted between the locking members of the first cable bushing or between the locking members of the second cable bushing.

5. The wire fixture according to claim 1, wherein
at least one of the first main body portion and the second main body portion includes a support member to be fitted in the wire mounting hole.

6. The wire fixture according to claim 2, wherein
at least one of the first main body portion and the second main body portion includes a support member to be fitted in the wire mounting hole.

7. The wire fixture according to claim 3, wherein
at least one of the first main body portion and the second main body portion includes a support member to be fitted in the wire mounting hole.

8. The wire fixture according to claim 4, wherein
at least one of the first main body portion and the second main body portion includes a support member to be fitted in the wire mounting hole.

9. The wire fixture according to claim 1, wherein
the first main body portion comprises a straight recess and the second main body portion comprises a straight protrusion.

10. The wire fixture according to claim 1, wherein
at least one of the first main body portion and the second main body portion includes a plate-shaped support member to be fitted in the wire mounting hole.

11. The wire fixture according to claim 9, wherein
at least one of the first main body portion and the second main body portion includes a plate-shaped support member to be fitted in the wire mounting hole.

12. The wire fixture according to claim 9, wherein
the straight protrusion of the second main body portion is slid into the straight recess of the first main body portion to fit the first main body portion to the second main body portion.

13. The wire fixture according to claim 1, wherein
each of the first and second main body portions comprises:
    a protrusion formed on one side portion of the each of the first and second main body portions;
    a recess formed on other side portion of the each of the first and second main body portions; and
    a plate-shaped support member to be fitted in the wire mounting hole.

\* \* \* \* \*